2,878,254
Patented Mar. 17, 1959

2,878,254

N,N'-ALKYLENE-BIS-(3-HYDROXYPIPERIDINE) COMPOUNDS AND PREPARATION THEREOF

Seymour L. Shapiro, Hastings-on-Hudson, and Louis Freedman, Mount Vernon, N. Y., and Kurt Weinberg, Hackensack, N. J., assignors to U. S. Vitamin Corporation, New York, N. Y., a corporation of Delaware No Drawing. Application September 6, 1956
Serial No. 608,214

2 Claims. (Cl. 260—293.2)

This invention relates to a composition of matter and to a method for production thereof. More particularly, it pertains to the preparation of N,N'-alkylene-bis-(3-hydroxypiperidine) compounds and their derivatives, and includes correlated improvements and discoveries whereby novel compounds are obtained.

The compounds of this invention are represented by the following general formula

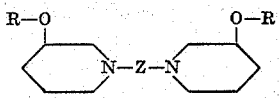

where Z is an alkylene group of not more than 10 carbon atoms, said alkylene group having a straight chain of carbon atoms and branching groups on the straight chain, and an alkylene-arylene-alkylene group; R is a member of the group consisting of hydrogen and an acyl group selected from the group consisting of acetyl, propionyl, butyryl, isobutyryl and benzoyl, and alkyl and dialkylaminoalkyl etherifying groups, the alkyl groups being lower alkyl, e. g., ethyl and dimethylaminoethyl.

It is an object of this invention to provide a method for the synthesis of N,N'-alkylene-bis-(3-hydroxypiperidine) compounds which may be carried out effectively, readily and economically.

A principal object of the invention is the provision of N,N'-alkylene-bis-(3-hydroxypiperidine) compounds by hydrogenation of an N,N'-substituted-bis-(3-oxypyridyl) betaine.

Other objects of the invention will in part be obvious and will in part appear hereinafter.

The invention accordingly comprises the several steps and the relation of one or more of such steps with respect to each of the others, and the composition possessing the features, properties, and the relation of constituents, which are exemplified in the following detailed disclosure, and the scope of the invention will be indicated in the claims.

The N,N'-alkylene-bis-(3-hydroxypiperidines) are prepared from the N,N'-substituted-bis-(3-oxypyridyl)betaines described in our co-pending application, filed of even date herewith Serial No. 608,195, by hydrogenation with hydrogen under conditions such as room temperature, i. e., about 20° C. and about 50 lbs. pressure in the presence of a hydrogenation catalyst. The preferred hydrogenation catalyst is rhodium, e. g., 5%, and suitably on carbon which we have found permits the hydrogenation to proceed in the manner desired without side reactions or loss of hydroxyl groups in the final product. The quantity of rhodium on carbon may vary and the amount used desirably occasions completion of reaction in minimal time without excess usage of the expensive catalyst. Difficulties are experienced when platinum oxide is used as the hydrogenation catalyst in that yields of the desired compound are poor, and side products, so far uncharacterized, are obtained.

When the theoretical uptake of hydrogen has been obtained, the product is isolatable directly as an acid addition salt, or it may be converted to the free base, and then extracted and purified by distillation. The following equation represents a typical hydrogenation:

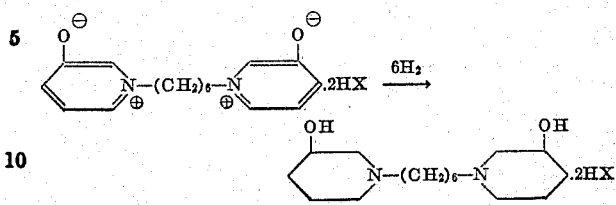

wherein X is chlorine, bromine, iodine, benzsulfonate and p-toluene sulfonate.

The formation of derivatives, such as esters, ethers and dialkylaminoalkylethers, on the two hydroxyl groups of the formed N,N'-alkylene-bis-(3-hydroxypiperidines) may follow the usual synthetic organic procedures.

As an illustrative embodiment of a manner in which the invention may be practiced, the following examples are presented.

EXAMPLE 1

*N,N'-tetramethylene-bis-(3-hydroxypiperidine)
di-hydrochloride*

A solution of 22.52 g. of N,N'-tetramethylene-bis-(3-oxypyridyl)betaine dihydrochloride (prepared from 3-hydroxypyridine and 1,4-dichlorobutane as described in our co-pending application filed of even date herewith, Serial No. 608,195, was prepared in 250 cc. of methanol and 2 g. of rhodium on carbon added. (The catalyst used throughout these examples is available as 5% rhodium on carbon from Baker & Co., Newark 5, N. J.) The reaction mixture was hydrogenated under 50 lbs. of hydrogen pressure at room temperature for two hours at which point 92% of the theoretical uptake of hydrogen had been effected. The catalyst was filtered and the filtrate concentrated to 100 ml. on a steam bath, cooled, and upon addition of 300 cc. of ether a crystalline product separated which was recrystallized from methanol-ethyl acetate.

*Analysis.*—Calculated: C, 51.1; H, 9.1; N, 8.5. Found: C, 50.9; H, 9.4; N, 8.8.

The product is also obtainable using N,N'-tetramethylene-Δ-2-bis-(3-oxypyridyl betaine)dihydrobromide as a starting material.

The dihydrochloride, thus obtained, was converted to the free base by dissolving in water; adding excess 6N sodium hydroxide, and extracting with chloroform. The chloroform extract was dried over anhydrous magnesium sulfate; filtered; the chloroform evaporated, and the crystalline residue recrystallized from heptane.

*Analysis.*—Calculated: C, 65.6; H, 11.0; N, 10.9. Found: C, 65.7; H, 10.9; N, 11.3.

The diether, N,N'-tetramethylene-bis-(3-ethoxypiperidine) was prepared from the base as follows:

A solution of 7.68 g. of the base in 90 cc. of toluene was treated with 1.68 g. of sodium hydride, and the reaction stirred and refluxed for 1 hour; then 10.1 g. of ethyl iodide were added and stirring and refluxing continued for 2 hours. The reaction mixture was cooled; filtered; the toluene evaporated, and the residue distilled. There was obtained a product as a light yellow oil.

*Analysis.*—Calculated: C, 69.2; H, 11.6; N, 8.9. Found: C, 68.9; H, 11.7; N, 8.9.

The di-(dimethylaminoether) of the base was prepared as follows:

A solution of 7.68 g. of the base in 90 cc. of toluene was heated with 1.68 g. of sodium hydride, and the reaction mixture stirred and refluxed for 2 hours. To the cooled reaction mixture, were added 40 cc. of a toluene solution of dimethylaminoethylchloride (prepared by dissolving 13.96 g. of dimethylaminoethylchloride hydrochloride in 30 cc. of H₂O, adding 50 cc. of 6 N sodium hydroxide, extracting with 2 x 20 cc. of toluene, and drying the toluene extract over anhydrous magnesium sulfate). The reaction mixture was stirred and refluxed for 10 hours; cooled; cleared by centrifugation; the toluene evaporated, and the residue distilled. There was thus obtained N,N'-tetramethylene-bis-(3-dimethylaminoethoxypiperidine).

*Analysis.*—Calculated: C, 66.3; H, 11.6; N, 14.1. Found: C, 66.4; H, 11.2; N, 14.0.

The tetramethiodide of the above aminoether was prepared by treating 0.8 g. in 10 cc. of methanol and 9 cc. of acetonitrile with excess methyl iodide and refluxing until cloudy. On cooling, 15 cc. of ethyl acetate were added, and after standing 24 hours, the crystalline product was filtered off, and recrystallized from ethanol. The product so obtained is of the following formula:

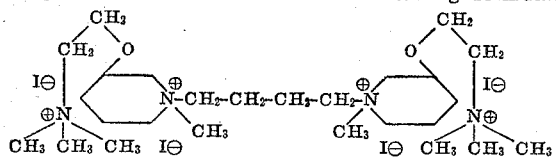

*Analysis.*—Calculated: C, 32.3; H, 6.0; N, 5.8. Found: C, 31.4; H, 6.2; N, 5.3.

The bis-oxyacetate of the free base was prepared by treating 6 g. with 60 cc. of acetic anhydride and allowing to stand 48 hours. The excess of acetic anhydride was removed in vacuo, mm. Hg; the oily residue dissolved in 75 cc. of ether, and 15 cc. of water added. N sodium hydroxide was then added cautiously to pH 8. The ether layer separated, and the aqueous layer was extracted with 25 cc. of ether; the ether extracts combined; dried over anhydrous magnesium sulfate; filtered, the ether evaporated, and the residue distilled yielding N,N'-tetramethylene-bis-(3-acetoxypiperidine).

*Analysis.*—Calculated: C, 63.5; H, 9.5; N, 8.2. Found: C, 62.7; H, 9.4; N, 7.7.

The N,N'-tetramethylene-bis-(3-propionoxypiperidine) was prepared as above using propionic anhydride.

The di-hydrochloride of the above was prepared by neutralization with HCl in methanol.

*Analysis.*—Calculated: C, 54.4; H, 8.6. Found: C, 54.2; H, 8.6.

The N,N' - tetramethylene - bis - (3 - butyroxypiperidine) was prepared from 6 g. of base in a maner as described for the acetoxy compound using butyric anhydride and a pale yellow oil was obtained.

*Analysis.*—Calculated: C, 66.6; H, 10.2; N, 7.1. Found: C, 66.6; H, 10.0; N, 6.9.

The N,N' - tetramethylene - bis - (3 - iso - butyroxypiperidine) was prepared from 6.2 g. of base dissolved in 20 cc. of pyridine; the solution cooled to 5° C. and 7.4 g. of isobutyryl chloride added slowly with continued stirring and cooling. After addition was complete the reaction mixture was allowed to stand 24 hours. The reaction mixture was diluted with ether precipitating the dihydrochloride of the product. The dihydrochloride was dissolved in 20 cc. of water; 60 cc. of ether added, and N sodium hydroxide added cautiously to pH 8. The ether layer was separated; the aqueous phase re-extracted with 60 cc. of ether; the ethereal extracts combined; dried over anhydrous magnesium sulfate; filtered; the ether evaporated, and the residue distilled.

*Analysis.*—Calculated: C, 66.6; H, 10.2; N, 7.1. Found: C, 66.8; H, 10.2; N, 7.0.

EXAMPLE 2

*N,N'-(1,4-dimethyl-tetramethylene)-bis-(3-hydroxypiperidine)*

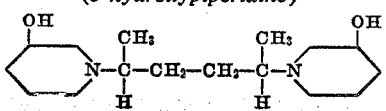

A suspension of 18 g. of N,N'-(1,4-dimethyl-tetramethylene)-bis-(3-oxypyridyl) betaine dihydrobromide in 250 cc. of methanol was treated with 2 g. of 5% rhodium on carbon and the reaction mixture hydrogenated as in Example 1. After 1.5 hours 91% of theoretical hydrogen uptake had been obtained, and no further hydrogen was taken up after additional 1.5 hours of hydrogenation. The catalyst was filtered; 150 cc. of water added to the filtrate, and the metanol removed in vacuo, 15 mm. Hg. To the aqueous solution were added 200 cc. of 6 N sodium hydroxide and the liberated free base extracted with 2 x 100 cc. of chloroform. The chloroform extracts were combined; dried over anhydrous magnesium sulfate; filtered; the chloroform evaporated, and the residue distilled to yield the product.

*Analysis.*—Calculated: C, 67.6; H, 11.3; N, 9.9. Found: C, 67.7; H, 11.1; N, 9.9.

N,N' - (1,4 - dimethyl - tetramethylene) - bis - (3-acetoxypiperidine was prepared from 2.75 g. of the above base and acetic anhydride in a manner similar to that described for Example 1.

*Analysis.*—Calculated: C, 65.2; H, 9.9; N, 7.6. Found: C, 64.9; H, 9.9; N, 8.0.

EXAMPLE 3

*N,N'-hexamethylene-bis-(3-hydroxypiperidine)*

A suspension of 40.4 g. of N,N'-hexamethylene-bis-(3-oxypyridyl)betaine-dihydrobromide in 250 cc. of methanol and 2 g. of 5% rhodium on carbon was hydrogenated as described in Example 1. After 8 hours at hydrogenation temperature of 35° C., 98% of theoretical hydrogen uptake was obtained. The catalyst was filtered; the methanol solution concentrated to above 90 cc.; 100 cc. of ethyl acetate added with precipitation after standing overnight of the dihydrobromide of the product.

*Analysis.*—Calculated: C, 43.1; H, 7.6; N, 6.3. Found: C, 43.6; H, 8.0; N, 6.1.

To 3 g. of the dihydrobromide, prepared as above, dissolved in 5 cc. of water, 20 cc. of 6 N sodium hydroxide were added. The liberated base was extracted with a mixture of 10 cc. of ether and 10 cc. of chloroform. The organic phase was separated; dried with anhydrous magnesium sulfate; filtered; the solvents removed, and the residue distilled. After a few minutes the distillate crystallized and was recrystallized from hexane.

*Analysis.*—Calculated: C, 68.5; H, 11.4; N, 9.9. Found: 67.6; H, 11.3; N, 9.9.

The N,N' - hexamethylene - bis-(3-butyroxypiperidine) was prepared from 6.0 g. of the above base and butyric anhydride in a manner similar to that described in Example 1.

*Analysis.*—Calculated: C, 67.9; H, 10.4; N, 6.6. Found: C, 67.9; H, 10.1; N, 6.8.

EXAMPLE 4

*N,N'-decamethylene-bis-(3-hydroxypiperidine)*

A solution of 26.35 g. of N,N'-decamethylene-bis-(3-oxypyridyl)betaine dihydrobromide in 250 cc. of methanol was treated with 2 g. of 5% rhodium on carbon and hydrogenated as in Example 1. After 5 hours' hydrogenation at 20° C., 96% of theoretical hydrogen uptake was obtained. The catalyst was filtered; the methanol solution concentrated to 90 cc., and 350 cc. of ether added. After 1 hour the dihydrobromide product was filtered off, and recrystallized from methanol.

*Analysis.*—Calculated: C, 47.8; H, 8.4; N, 5.6. Found: C, 47.6; H, 8.6; N, 5.8.

Three g. of the above dihydrobromide were dissolved in 5 cc. of water; 20 cc. of 6 N sodium hydroxide added, and the liberated free base extracted with 20 cc. of chloroform. The chloroform extract was dried over anhydrous magnesium sulfate; filtered; the chloroform evaporated, and the resulting crystalline residue recrystallized from pentane.

*Analysis.*—Calculated: C, 70.5; H, 11.8; N, 8.2. Found: C, 71.0; H, 11.7; N, 7.9.

The N,N'-decamethylene-bis-(3-butyroxypiperdine) was prepared in a manner similar to that described in Example 3, with utilization of 6 g. of the base and obtention of the compound as a yellow oil.

*Analysis.*—Calculated: C, 69.95; H, 10.6; N, 5.8. Found: C, 69.2; H, 10.8; N, 5.8.

Representative compounds of those herein disclosed are given in Table I, and the manner of that preparation is described in the preceding examples.

TABLE I

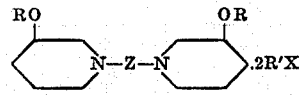

| | Z | R | R'X | M. P., °C. | B. P., °C/mm. Pressure | Formula |
|---|---|---|---|---|---|---|
| 1 | —(CH$_2$)$_3$— | H— | | | 146–51/0.07 | C$_{13}$H$_{26}$N$_2$O$_2$ |
| 2 | —(CH$_2$)$_3$— | H— | CH$_3$I | 245–7 | | C$_{15}$H$_{32}$N$_2$O$_2$I$_2$ |
| 3 | —(CH$_2$)$_3$— | C$_2$H$_5$— | | | 124/0.02 | C$_{17}$H$_{34}$N$_2$O$_2$ |
| 4 | —(CH$_2$)$_3$— | (CH$_3$)$_2$—N—CH$_2$—CH$_2$— | | | 162–70/0.19 | C$_{21}$H$_{44}$N$_4$O$_2$ |
| 5 | —(CH$_2$)$_3$— | CH$_3$—C(=O)— | | | 138–40/0.055 | C$_{17}$H$_{30}$N$_2$O$_4$ |
| 6 | —(CH$_2$)$_3$— | CH$_3$—CH$_2$—C(=O)— | | | 146–51/0.003 | C$_{19}$H$_{34}$N$_2$O$_4$ |
| 7 | —(CH$_2$)$_3$— | CH$_3$—CH$_2$—CH$_2$—C(=O)— | | | 156–62/0.005 | C$_{21}$H$_{38}$N$_2$O$_4$ |
| 8 | —(CH$_2$)$_3$— | (CH$_3$)$_2$CH—C(=O)— | | | 156–8/0.03 | C$_{21}$H$_{38}$N$_2$O$_4$ |
| 9 | —(CH$_2$)$_4$— | H | | | 130–3/0.35 | C$_{14}$H$_{28}$N$_2$O$_2$ |
| 10 | —(CH$_2$)$_4$— | H | HBr | 261–62.5 | | C$_{14}$H$_{30}$N$_2$O$_2$Br$_2$ |
| 11 | —(CH$_2$)$_4$— | H | HCl | 263–5 | | C$_{14}$H$_{30}$N$_2$O$_2$Cl$_2$ |
| 12 | —(CH$_2$)$_4$— | H | CH$_3$I | 235–7 | | C$_{16}$H$_{34}$N$_2$O$_2$I$_2$ |
| 13 | —(CH$_2$)$_4$— | C$_2$H$_5$— | | | 139–46/0.1 | C$_{18}$H$_{36}$N$_2$O$_2$ |
| 14 | —(CH$_2$)$_4$— | (CH$_3$)$_2$—N—CH$_2$—CH$_2$— | | | 148–65/0.03 | C$_{22}$H$_{46}$N$_4$O$_2$ |
| 15 | —(CH$_2$)$_4$— | (CH$_3$)$_2$—N—CH$_2$—CH$_2$— | CH$_3$I$^a$ | 158–60 | | C$_{26}$H$_{58}$N$_4$O$_2$I$_4$ |
| 16 | —(CH$_2$)$_4$— | CH$_3$—C(=O)— | | | 150–2/.015 | C$_{18}$H$_{32}$N$_2$O$_4$ |
| 17 | —(CH$_2$)$_4$— | CH$_3$—CH$_2$—C(=O)— | HCl | 270–5 d. | | C$_{20}$H$_{38}$N$_2$O$_4$Cl$_2$ |
| 18 | —(CH$_2$)$_4$— | CH$_3$—CH$_2$—CH$_2$—C(=O)— | | | 170–4/0.02 | C$_{22}$H$_{40}$N$_2$O$_4$ |
| 19 | —(CH$_2$)$_4$— | (CH$_3$)$_2$CH—C(=O)— | | | 156–62/0.015 | C$_{22}$H$_{40}$N$_2$O$_4$ |
| 20 | —(CH$_2$)$_5$— | H | | | 166–9/0.2 | C$_{15}$H$_{30}$N$_2$O$_2$ |
| 21 | —(CH$_2$)$_5$— | H | HBr | 173–5 | | C$_{15}$H$_{32}$N$_2$O$_2$Br$_2$ |
| 22 | —(CH$_2$)$_5$— | H | CH$_3$I | 257–8 | | C$_{17}$H$_{36}$N$_2$O$_2$I$_2$ |
| 23 | —(CH$_2$)$_5$— | C$_2$H$_5$— | | | 140–50/0.01 | C$_{19}$H$_{38}$N$_2$O$_2$ |
| 24 | —(CH$_2$)$_5$— | (CH$_3$)$_2$—N—CH$_2$—CH$_2$— | | | 172–9/0.015 | C$_{23}$H$_{48}$N$_4$O$_2$ |
| 25 | —(CH$_2$)$_5$— | (CH$_3$)$_2$—N—CH$_2$—CH$_2$— | CH$_3$I$^a$ | 250–4 | | C$_{27}$H$_{60}$N$_4$O$_2$I$_4$ |
| 26 | —(CH$_2$)$_5$— | CH$_3$—C(=O)— | | | 158–64/0.05 | C$_{19}$H$_{34}$N$_2$O$_4$ |
| 27 | —(CH$_2$)$_5$— | CH$_3$—CH$_2$—C(=O)— | | | 168–72/0.04 | C$_{21}$H$_{38}$N$_2$O$_4$ |
| 28 | —(CH$_2$)$_5$— | CH$_3$—CH$_2$—CH$_2$—C(=O)— | | | 177–84/0.03 | C$_{23}$H$_{42}$N$_2$O$_4$ |
| 29 | —(CH$_2$)$_5$— | (CH$_3$)$_2$CH—C(=O)— | | | 178–88/0.035 | C$_{23}$H$_{42}$N$_2$O$_4$ |
| 30 | —(CH$_2$)$_6$— | H | | | 166–8/0.3 | C$_{16}$H$_{32}$N$_2$O$_2$ |
| 31 | —(CH$_2$)$_6$— | H | HBr | 91–3<br>218–21 | | C$_{16}$H$_{34}$N$_2$O$_2$Br |
| 32 | —(CH$_2$)$_6$— | H | CH$_3$I | 182–4 | | C$_{18}$H$_{38}$N$_2$O$_2$I$_2$ |
| 33 | —(CH$_2$)$_6$— | C$_2$H$_5$— | | | 150–8/0.08 | C$_{20}$H$_{40}$N$_2$O$_2$ |

See footnote at end of table.

TABLE I—Continued

| | Z | R | R'X | M.P., °C. | B.P., °C/mm. Pressure | Formula |
|---|---|---|---|---|---|---|
| 34 | —(CH₂)₆— | (CH₃)₂N—CH₂—CH₂— | | | 186–90/0.16 | C₂₄H₅₀N₄O₂ |
| 35 | —(CH₂)₆— | (CH₃)₂N—CH₂—CH₂— | CH₃I[a] | 270–6 | | C₂₆H₅₆N₄O₂I₂ |
| 36 | —(CH₂)₆— | CH₃—CO— | | 67–68.5 | | C₂₀H₃₆N₂O₄ |
| 37 | —(CH₂)₆— | CH₃—CO— | CH₃.Tos[b] | 106–10 | | C₃₆H₅₆N₂O₁₀S₂ |
| 38 | —(CH₂)₆— | CH₃—CH₂—CO— | | | 176–82/0.025 | C₂₂H₄₀N₂O₄ |
| 39 | —(CH₂)₆— | CH₃—CH₂—CO— | CH₃.Tos[b] | 125–7 | | C₃₈H₆₀N₂O₁₀S₂ |
| 40 | —(CH₂)₆— | CH₃—CH₂—CH₂—CO— | | | 188–90/0.03 | C₂₄H₄₄N₂O₄ |
| 41 | —(CH₂)₆— | CH₃—CH₂—CH₂—CO— | CH₃.Tos[b] | 108–10 | | C₄₀H₆₄N₂O₁₀S₂ |
| 42 | —(CH₂)₆— | (CH₃)₂CH—CO— | | | 180–5/0.015 | C₂₄H₄₄N₂O₄ |
| 43 | —(CH₂)₆— | (CH₃)₂CH—CO— | CH₃.Tos[b] | 114–5 | | C₄₀H₆₄N₂O₁₀S₂ |
| 44 | —CH(CH₃)—CH₂—CH₂—CH(CH₃)— | H | | | 162–8/0.05 | C₁₆H₃₂N₂O₂ |
| 45 | —CH(CH₃)—CH₂—CH₂—CH(CH₃)— | CH₃—CO— | | | 158–62/0.03 | C₂₀H₃₆N₂O₄ |
| 46 | —CH(CH₃)—CH₂—CH₂—CH(CH₃)— | (CH₃)₂N—CH₂—CH₂— | | | 168–75/0.11 | C₂₄H₅₀N₄O₂ |
| 47 | —(CH₂)₁₀— | H | | 79–81 | 206/0.08 | C₂₀H₄₀N₂O₂ |
| 48 | —(CH₂)₁₀— | H | HBr | 189–93 | | C₂₀H₄₂N₂O₂Br₂ |
| 49 | —(CH₂)₁₀— | H | CH₃I | 165–75 | | C₂₂H₄₆N₂O₂I₂ |
| 50 | —(CH₂)₁₀— | C₂H₅ | | | 180–8/0.2 | C₂₄H₄₈N₂O₂ |
| 51 | —(CH₂)₁₀— | (CH₃)₂N—CH₂—CH₂ | | | 182–94/0.15 | C₂₈H₅₈N₄O₂ |
| 52 | —(CH₂)₁₀— | CH₃—CO— | | 75–8 | | C₂₄H₄₄N₂O₄ |
| 53 | —(CH₂)₁₀— | CH₃—CO— | CH₃.Tos[b] | 116–23 | | C₄₀H₆₄N₂O₁₀S₂ |
| 54 | —(CH₂)₁₀— | CH₃—CH₂—CO— | | | 196–204/0.03 | C₂₆H₄₈N₂O₄ |
| 55 | —(CH₂)₁₀— | CH₃—CH₂—CH₂—CO— | | | 208–10/0.08 | C₂₈H₅₂N₂O₄ |
| 56 | —(CH₂)₁₀— | CH₃—CH₂—CH₂—CO— | CH₃.Tos[b] | 125–7 | | C₄₄H₇₂N₂O₁₀S₂ |

See footnote at end of table.

TABLE I—Continued

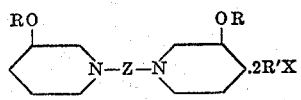

| Z | R | R'X | M. P., °C. | B. P., °C/mm. Pressure | Formula |
|---|---|---|---|---|---|
| 57.....  —(CH$_2$)$_{10}$— | CH$_3$\\C—C—  /  CH$_3$  (with H and O) | | | 198–208/0.02 | C$_{28}$H$_{52}$N$_2$O$_4$ | a 4 CH$_3$I.
b Tos=p-toluene-sulfonate.

The novel compounds herein described may conveniently be used in the form of water-soluble, non-toxic acid addition salts, and these salts are within the purview of this invention. The acids which can be used to prepare the acid addition salts are those which produce salts whose anions are relatively innocuous in therapeutic doses of the salts so that the beneficial physiological properties inherent in these compounds are not vitiated by side effects ascribable to the anions. Appropriate acid addition salts are those obtained by reaction of mineral acids, e. g., hydrochloric, hydrobromic, hydriodic and sulfuric acids, and organic acids such as p-toluenesulfonic, citric and tartaric acids, and the like.

Certain of the compounds of this invention contain in a single molecular unit the important physiologically active units of the choline-acetyl choline, and the methonium structures. Further, the novel compounds are of decided interest and utility due to their pronounced pharmacological activity, and it is a function of the compounds to afford structures with anti-hypertensive activity, ganglionic blocking action, and anti-inflammatory activity.

It will thus be seen that the objects set forth above, among those made apparent from the preceding description, are efficiently attained and, since certain changes may be made in carrying out the above method and in the composition set forth without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A method of preparing a N,N'-alkylene-bis-(3-hydroxypiperidine) which comprises hydrogenating a N,N'-alkylene-bis-(3-oxypyridyl) betaine in a solvent in the presence of rhodium as a catalyst, and separating the reaction product.

2. A method as defined in claim 1, in which the catalyst is 5% rhodium on carbon.

References Cited in the file of this patent
UNITED STATES PATENTS

| | | |
|---|---|---|
| 2,675,390 | Rosenblatt | Apr. 13, 1954 |
| 2,746,966 | Biel | May 22, 1956 |
| 2,746,967 | Biel | May 22, 1956 |